United States Patent Office 3,097,052
Patented July 9, 1963

3,097,052
TREATMENT OF WOOL WITH ACID ANHYDRIDES
IN THE PRESENCE OF ACETIC ACID
Nathan H. Koenig, Berkeley, Calif., assignor to the United States of America as represented by the Secretary of Agriculture
No Drawing. Filed Aug. 25, 1961, Ser. No. 134,056
12 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic acid anhydride. In particular, the invention concerns and has as its prime object the provision of processes wherein the reaction of wool with organic acid anhydrides is conducted in the presence of acetic acid. Unless otherwise indicated, the term "acetic acid" used herein signifies glacial acetic, containing less than 1% of water. Further objects and advantages of the invention will be apparent from the following description wherein parts and percentages are by weight, unless otherwise specified.

Prior to this invention it has been advocated that wool be modified by applying an acid anhydride to the wool followed by baking the treated wool in an oven. In another technique, the wool is heated with a solution of acid anhydride in an organic solvent such as benzene or carbon tetrachloride. Under these conditions only a minor amount of acid anhydride actually reacts with the wool so that the degree of modification is low.

In accordance with the present invention, wool is reacted with an acid anhydride in the presence of acetic acid. The latter compound catalyzes the actual chemical combination of the wool and the acid anhydride reactant. As a consequence one is enabled to readily prepare wools containing substantial proportions of combined acid anhydride with correspondingly improved properties.

The unusual and effective action of acetic acid as a catalyst for the reaction of acid anhydrides with wool is exemplified by the following comparative tests: (a) Dry wool flannel (1.2 g.) and heptenylsuccinic anhydride (6 ml.) were heated for 30 minutes at 105° C. The wool was then extracted with acetone and ethanol to remove unreacted reagents and dried. It was found that the increase in weight of the wool was only 2%. (b) Dry wool flannel (1.2 g.) was heated with heptenylsuccinic anhydride (1 ml.) and acetic acid (5 ml.) at 105° C. for 30 minutes. The wool was extracted as described above and dried. In this case, the increase in weight of the wool, due to reaction with the acid anhydride, was 15%.

The fact that acetic acid acts as a catalyst rather than a mere solvent is demonstrated by the following experimental data: Dry wool flannel (1.2 g.), heptenylsuccinic anhydride (2 ml.), and acetic acid (4 ml.) were heated for one-half hour at 105° C. The wool was extracted with acetone and ethanol to remove unreacted reagents and dried. It was found that the increase in weight of the wool, due to reaction with the anhydride, was 20%. A series of experiments were then carried out under the same conditions but substituting for the acetic acid the same volume of the following solvents: butyl acetate, chlorobenzene, and xylene. In these runs, the increase in weight of the wool was only 2%.

Carrying out the process of the invention essentially involves contacting wool with an acid anhydride in the presence of acetic acid. The reaction conditions such as proportion of reagents, specific acid anyhdride used, time, temperature, etc., are not critical but may be varied to suit individual circumstances without changing the basic nature of the invention. The proportion of acetic acid may be varied widely and may be as low as 0.02 volume per volume of acid anhydride. In the case of acid anhydrides which are normally solid, the volume considered is that of the molten (liquefied) compound. Usually, it is preferred to use a larger proportion of acetic acid, i.e., about 0.1 to 5 volumes thereof per volume of acid anhydride, to attain an increased catalytic effect. The temperature of reaction may be about from 25° to 130° C. The reaction rate is increased with increasing temperature and a preferred temperature range to expedite the reaction without possibility of damage to the wool is 100–120° C. The effect of temperature on the rate of reaction is illustrated by the following: In a series of runs, n-dodecenylsuccinic anhydride (6 ml.) was reacted with dry wool flannel (1.2 g.) in the presence of acetic acid (4 ml.) under varying conditions of time and temperature. Uptakes of acid anhydride obtained under these conditions were as follows:

| Reaction conditions: | Uptake of acid anhydride on wool, percent |
|---|---|
| 50° C.—90 minutes | 15 |
| 50° C.—300 minutes | 24 |
| 105° C.—30 minutes | 25 |
| 105° C.—90 minutes | 31 |

Conventional inert solvents such as chlorobenzene, xylene, or butyl acetate may be added to the reaction system. The use of a solvent is especially indicated where the acid anhydride used is a solid and the proportion of acetic acid is not sufficient to dissolve the acid anhydride. It is preferred to carry out the reaction under anhydrous conditions thereby to ensure reaction between the wool and the acid anhydride, but the reaction can also be applied to wool in its normal undried condition (containing about 12–14% water). The degree of modification of the wool is related to the proportion of acid anhydride taken up by the fiber, that is, the higher the uptake of acid anhydride the greater will be the modification of the wool. In general, the uptake of acid anhydride may be varied about from 1 to 40% by weight. In conducting the reaction, the acid anhydride is generally employed in excess over the amount desired to be taken up by the fiber. The time of reaction will vary depending on the proportion of acetic acid, temperature of reaction, reactivity of the acid anhydride selected, and the degree of modification desired. In general, the reaction may take anywhere from a few minutes to several hours.

The process in accordance with the invention may be carried out in various ways. For example, the wool may be directly contacted with the acetic acid and acid anhydride reactant and the reaction mixture preferably heated as indicated above to cause the acid anhydride to react with the wool. In the alternative, the wool may be pretreated with acetic acid and the acid anhydride then added to the mixture and the reaction carried out as previously described. The pretreatment may be carried out at normal temperature or with application of heat, i.e., at 25–130° C.

After reaction of the wool with the acid anhydride, the chemically modified wool is preferably treated to remove excess acid anhydride, reaction by-products, acetic acid, and solvent, if such is used. Thus, the wool may be treated as by wringing, passage through squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

By treating wool with acid anhydrides as herein described, the wool is chemically modified because there is a chemical reaction between the acid anhydride and the protein molecules of the wool fibers. As a result the modified wool exhibits advantageous properties over normal wool as explained below:

An advantageous feature of the invention is the increased resistance of the modified wool to acids as indicated by its decreased solubility in hot hydrochloric acid. This factor improves the usefulness of the modified wool in applications where the product comes into contact with acidic materials. For example, wool may encounter acid conditions during manufacturing processes such as carbonizing to remove burrrs; dyeing in acid dye baths; and fulling with acid media. The more resistant the wool is to such acid environments, the greater will be its subsequent mechanical strength and wear resistance.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the wool and the acid anhydride has taken place, it is not known for certain how the wool and acid anhydride moieties are joined. It is believed, however, that the acid anhydride reacts with some of the sites on the wool molecule where there are reactive hydrogen atoms, e.g., amino, guanidino, hydroxyl, and phenolic groups. It may be, however, that other reactions occur and it is not intended to limit the invention to any theoretical basis. When the reaction is carried out with polybasic acid anhydrides, for example, pyromellitic dianhydride, combination with the wool may establish cross-links between protein molecules of the wool that further increase the resistance of the fibers to chemical attack.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The invention is of particular advantage in reacting wool with acid anhydrides of higher molecular weight—that is, those with more than eight carbon atoms. Such anhydrides are notorious for their inability to react with wool when using known procedures. However, by applying the process disclosed herein such anhydrides can be caused to react readily with wool.

Although the invention is particularly adapted for reacting wool with acid anhydrides containing more than eight carbon atoms, the catalytic effect of acetic acid is not restricted to any particular acid anhydride or class of acid anhydrides. Consequently, the invention may be applied in the reaction of wool with all types of organic acid anhydrides. Particularly preferred are the aliphatic, aromatic, and aromatic-aliphatic compounds containing one or more of the characteristic anhydride linkages, that is, the group

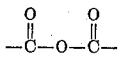

The anhydrides may be hydrocarbon acid anhydrides or may contain substituents on the hydrocarbon residues such as halogen (chlorine, bromine, iodine, or fluorine), ether groups, ester groups, nitro groups, carboxy groups, etc. Examples of compounds coming within the purview of the invention are lisited below by way of illustration and not limitation:

Typical examples of compounds in the category of aliphatic acid anhydrides are acetic anhydride, propionic anhydride, butyric anhydride, valeric anhydride, isovaleric anhydride, trimethylacetic anhydride, caproic anhydride, caprylic anhydride, capric anhydride, lauric anhydride, myristic anhydride, palmitic anhydride, stearic anhydride, arachidic anhydride, crotonic anhydride, angelic anhydride, oleic anhydride, elaidic anhydride, linoleic anhydride, linolenic anhydride, maleic anhydride, fumaric anhydride, succinic anhydride, glutaric anhydride, adipic anhydride, pimelic anhydride, suberic anhydride, azelaic anhydride, sebacic anhydride, heptylsuccinic anhydride, octylsuccinic anhydride, decylsuccinic anhydride, dodecylsuccinic anhydride, heptenylsuccinic anhydride, octenylsuccinic anhydride, dodecenylsuccinic anhydride, tetrapropenylsuccinic anhydride, octadecenylsuccinic anhydride, tricosenylsuccinic anhydride, pentatriacontenylsuccinic anhydride, chloroacetic anhydride, bromoacetic anhydride, iodoacetic anhydride, fluoroacetic anhydride, 9,10-dichloro-octadecanoic anhydride, ethoxyacetic anhydride, carbethoxyacetic anhydride, α, β-dichlorosuccinic anhydride, cyclohexanecarboxylic anhydride, etc. Of the aliphatic acid anhydrides, it is preferred to use the anhydrides which contain at least eight carbon atoms. These compounds are preferred as they confer on the treated wool especially desirable properties including resistance to acids and shrinkage.

Typical examples in the category of aromatic acid anhydrides are benzoic anhydride, ortho-toluic anhydride, meta-toluic anhydride, paratoluic anhydride, naphthoic anhydride, dodecylbenzoic anhydride, ortho-chlorobenzoic anhydride, meta-chlorobenzoic anhydride, parachlorobenzoic anhydride, 2,4-dichlorobenzoic anhydride, nitrobenzoic anhydride, phthalic anhydride, isophthalic anhydride, terephthalic anhydride, tetrachlorophthalic anhydride, pyromellitic dianhydride, etc.

Typical examples in the category of aromatic-aliphatic anhydrides are phenylacetic anhydride, chlorophenylacetic anhydride, β-phenylpropionic anhydride, phenoxyacetic anhydride, etc.

Any of the mixed anhydrides may be employed, for example, acetic-lauric anhydride, acetic-stearic anhydride, acetic-oleic anhydride, propionic-palmitic anhydride, acetic-butyric anhydride, acetic-benzoic anhydride, benzoic-stearic anhydride, acetic-naphthenic anhydride, diacetic-succinic anhydride, di-acetic-dodecenylsuccinic anhydride, etc.

The invention is further demonstrated by the following illustrative examples:

*Example I*

A 3.4-gram sample of dry wool flannel was heated in an enameled tray with 2-grams of n-octadecenylsuccinic anhydride and 25 ml. of acetic acid for 60 minutes at 105° C. The treated fabric was removed from the tray and extracted by rinsing and wringing in warm acetone. It was then extracted with ethanol for 16 hours in a Soxhlet apparatus, dried and weighed. The uptake of anhydride, calculated from the gain in weight of the dried sample, was 11%.

*Example II*

A 3.4-gram sample of dry wool flannel was reacted with 2 grams of phthalic anhydride and 25 ml. of acetic acid for 60 minutes at 105° C. The treated wool was extracted as in Example I. The uptake of anhydride by the wool was 9%.

*Example III*

A 3.3-gram sample of dry wool flannel was reacted with 5 ml. of propionic anhydride and 25 ml. of acetic acid for 60 minutes at 105° C. The treated wool was extracted as in Example I. The uptake of anhydride by the wool was 8%.

Example IV

A 3.4-gram sample of dry wool flannel was reacted with 2 grams of maleic anhydride and 25 ml. of acetic acid for 60 minutes at 105° C. The treated wool was extracted as in Example I. The uptake of anhydride by the wool was 10%.

Example V

A 3.4-gram sample of dry wool flannel was reacted with 2 grams of pyromellitic dianhydride and 25 ml. of acetic acid for 60 minutes at 105° C. The treated wool was extracted as described in Example I. The uptake of anhydride by the wool was 24%.

Example VI

A series of runs were carried out in Petri dishes wherein dry wool flannel was reacted with various acid anhydrides in the presence of acetic acid. In these runs, the weight of dry wool was 1.2 grams and the temperature of reaction was 105° C. The treated wool samples were extracted as in Example I. The acid anhydrides used, the volume of reagents, the reaction time, and the uptake of acid anhydrides are tabulated below:

| Acid anhydride used | Amount of anhydride, ml. or g. | Volume of acetic acid, ml. | Reaction time, min. | Uptake of acid anhydride, percent |
|---|---|---|---|---|
| Heptenylsuccinic | 1 ml | 5 | 60 | 17 |
| Heptenylsuccinic | 5 ml | 1 | 60 | 20 |
| n-Octenylsuccinic | 6 ml | 4 | 90 | 22 |
| Tetrapropenylsuccinic | 6 ml | 4 | 90 | 25 |
| n-Dodecenylsuccinic | 7 ml | 2 | 90 | 37 |
| n-Octadecenylsuccinic | 2 g | 5 | 120 | 29 |
| 11-Tricosenylsuccinic | 2 ml | 4 | 60 | 14 |
| 11-Tricosenylsuccinic | 2 ml | 4 | 120 | 28 |
| 17-Pentatriacontenylsuccinic | 1 ml | 5 | 120 | 12 |

Example VII

A 1.3-gram sample of undried wool flannel, containing about 12% moisture, was heated with 1 ml. of heptenylsuccinic anhydride and 5 ml. of acetic acid for 60 minutes at 105° C. The treated wool was extracted as in Example I. The uptake of anhydride by the wool, based on the final dry weight and a calculated initial dry weight, was 15%.

Example VIII

A mixture of 1 ml. of heptenylsuccinic anhydride, 2 ml. acetic acid and 3 ml. xylene was added to 1.2 grams of dry wool flannel. The reaction system was heated at 105° C. for 60 minutes. The treated wool was extracted as in Example I. The uptake of anhydride by the wool was 18%.

Example IX

A mixture of 3 ml. n-dodecenylsuccinic anhydride, 2 ml. acetic acid and 5 ml. butyl acetate was added to 1.2 grams of dry wool flannel. The reaction system was heated at 105° C. for 90 minutes. The treated wool was extracted as in Example I. The uptake of anhydride by the wool was 26%.

Example X

The acid solubility of modified wools produced in accordance with the invention and that of untreated wool were determined in the following way: The wool sample is immersed in 5 N hydrochloric acid for one hour at 65° C. The loss in weight of the sample is then determined after thoroughly washing the acid-soaked wool.

The increased resistance of modified wools to hot hydrochloric acid is illustrated by the following data:

| Acid anhydride | Uptake of acid anhydride by wool, percent | Acid solubility, percent |
|---|---|---|
| None (untreated wool) | 0 | 15 |
| n-Octenylsuccinic | 18 | 3 |
| n-Dodecenylsuccinic | 37 | 1 |
| n-Octadecenylsuccinic | 11 | 7 |
| 11-Tricosenylsuccinic | 27 | 0 |

Example XI

Tests were carried out to determine the improvement in shrinkage characteristics of the modified wools. The shrinkage tests were carried out as follows: The wool samples were milled at 1700 r.p.m. for 2 minutes at 40-42° C. in an "Accelerotor" with 0.9% sodius oleate solution, using a liquod to wool ratio of 50 to 1. After this washing operation, the samples were measured to determine their area. The improvement in shrinkage properties of wool modified in accordance with the invention is demonstrated by the following data:

| Acid anhydride | Uptake of acid anhydride by wool, percent | Area shrinkage, percent |
|---|---|---|
| None (untreated wool) | 0 | 52 |
| Heptenylsuccinic | 27 | 3 |
| Tetrapropenylsuccinic | 25 | 0 |
| n-Dodecenylsuccinic | 32 | 3 |
| n-Octadecenylsuccinic | 29 | 1 |

The various alkenyl succinic anhydrides used in the above examples were commercial products having the type formula

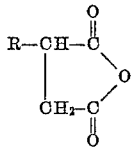

wherein R is an alkenyl radical. More specifically, the radical R in the various compounds is as follows:

Heptenylsuccinic anhydride: R is $C_7H_{13}$—
n-Octenylsuccinic anhydride: R is $C_8H_{15}$— (straight chain)
n-Dodecenylsuccinic anhydride: R is $C_{12}H_{23}$— (straight chain)
Tetrapropenylsuccinic anhydride: R is $C_{12}H_{23}$—
n-Octadecenylsuccinic anhydride: R is $C_{18}H_{35}$— (straight chain)
11-tricosenylsuccinic anhydride:

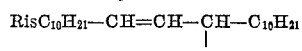

17-pentatriacontenylsuccinic anhydride:

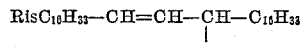

Having thus defined the invention, what is claimed is:

1. A process for chemically modifying wool which comprises reacting wool under essentially anhydrous conditions, in the presence of acetic acid, with an acid anhydride containing more than eight carbon atoms of the class consisting of aliphatic, aromatic, and aromatic-aliphatic acid anhydrides, in a reaction system consisting solely of said wool, acetic acid, and acid anhydride.

2. The process of claim 1 wherein the acide anhydride is an aliphatic mono-basic acid anhydride.

3. The process of claim 1 wherein the acid anhydride is lauric anhydride.

4. The process of claim 1 wherein the acid anhydride is myristic anhydride.

5. The process of claim 1 wherein the acid anhydride is palmitic anhydride.

6. The process of claim 1 wherein the acid anhydride is stearic anhydride.

7. The process of claim 1 wherein the acid anhydride is an alkenylsuccinic anhydride of the formula

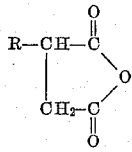

wherein R is an alkenyl radical of at least 7 carbon atoms.

8. The process of claim 7 wherein R is heptenyl.
9. The process of claim 7 wherein R is octenyl.
10. The process of claim 7 wherein R is dodecenyl.
11. The process of claim 7 wherein R is tricosenyl.
12. The process of claim 7 wherein R is pentatriacontenyl.

References Cited in the file of this patent

UNITED STATES PATENTS

| | | |
|---|---|---|
| 1,451,299 | Haynn et al. | Apr. 10, 1923 |
| 2,171,791 | Kaase et al. | Sept. 5, 1939 |

OTHER REFERENCES

Zahn et al.: Textile Research J., vol. XXV, No. 2, February 1955, pages 111–124.